US012186880B2

(12) United States Patent
Holly et al.

(10) Patent No.: US 12,186,880 B2
(45) Date of Patent: Jan. 7, 2025

(54) OSCILLATING POWER TOOL

(71) Applicant: MILWAUKEE ELECTRIC TOOL CORPORATION, Brookfield, WI (US)

(72) Inventors: Jeffrey S. Holly, West Bend, WI (US); Jacob N. Zimmerman, Pewaukee, WI (US); James C. Sitter, Milwaukee, WI (US); David A Bierdeman, New Berlin, WI (US); Andrew R. Schauer, Pewaukee, WI (US); You Gen Liu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/000,948

(22) PCT Filed: Jun. 10, 2021

(86) PCT No.: PCT/US2021/036707
§ 371 (c)(1),
(2) Date: Dec. 7, 2022

(87) PCT Pub. No.: WO2021/252701
PCT Pub. Date: Dec. 16, 2021

(65) Prior Publication Data

US 2023/0211490 A1 Jul. 6, 2023

(30) Foreign Application Priority Data

Jun. 12, 2020 (CN) ......................... 202021094627.5

(51) Int. Cl.
*B25F 5/02* (2006.01)
*B25F 1/02* (2006.01)
(Continued)

(52) U.S. Cl.
CPC .................. *B25F 5/02* (2013.01); *B25F 1/02* (2013.01); *B25F 3/00* (2013.01); *B25F 5/006* (2013.01)

(58) Field of Classification Search
CPC ....... B23B 31/10; B23B 2231/00; B25F 5/02; B25F 1/02; B25F 3/00; B25F 5/006
(Continued)

(56) References Cited

U.S. PATENT DOCUMENTS 1,874,250 A 8/1932 Decker
1,964,797 A 7/1934 Preston
(Continued)

FOREIGN PATENT DOCUMENTS

CN 201355025 Y 12/2009
CN 102416617 B 1/2016
(Continued)

OTHER PUBLICATIONS

International Search Report and Written Opinion for Application No. PCT/US2021/036707 dated Sep. 27, 2021 (10 pages).
(Continued)

*Primary Examiner* — Michelle Lopez
(74) *Attorney, Agent, or Firm* — Michael Best & Friedrich LLP

(57) ABSTRACT

An oscillating power tool includes an outer housing, and an inner housing positioned within the outer housing. A motor and a drive mechanism are supported by the inner housing. The drive mechanism includes an output shaft that is rotational in an oscillating manner and that defines an output axis. A damping element is positioned between the inner housing and the outer housing through which the inner housing is mounted to the outer housing, thereby attenuating vibration transmitted to the outer housing from the inner housing. An over-travel limit member is positioned between
(Continued)

the inner housing and the outer housing. In response to relative movement between the inner housing and the outer housing while the power tool is in use, the limit member is configured to prevent direct contact between the inner housing and the outer housing, inhibiting vibration produced by the motor and/or drive mechanism from bypassing the damping element.

18 Claims, 15 Drawing Sheets

(51) Int. Cl.
*B25F 3/00* (2006.01)
*B25F 5/00* (2006.01)

(58) Field of Classification Search
USPC ........................................................ 173/162.2
See application file for complete search history.

(56) References Cited

U.S. PATENT DOCUMENTS

| | | | |
|---|---|---|---|
| 4,268,233 | A | 5/1981 | Fernstrom |
| 4,635,732 | A | 1/1987 | Gotsch et al. |
| 5,473,519 | A | 12/1995 | McCallops et al. |
| 6,394,191 | B1 | 5/2002 | Nakane |
| 6,886,961 | B2 | 5/2005 | Hara et al. |
| 6,910,783 | B2 | 6/2005 | Mezei et al. |
| 7,185,998 | B2 | 3/2007 | Oomori et al. |
| 7,406,245 | B2 | 7/2008 | Page et al. |
| 7,677,752 | B2 | 3/2010 | Tadokoro et al. |
| 7,682,035 | B2 | 3/2010 | Wuensch et al. |
| 7,815,356 | B2 | 10/2010 | Lutz et al. |
| 7,850,325 | B2 | 12/2010 | Wall et al. |
| 7,914,167 | B2 | 3/2011 | Petersen |
| 7,934,847 | B2 | 5/2011 | Oomori et al. |
| 8,016,048 | B2 | 9/2011 | Ueda et al. |
| 8,042,966 | B2 | 10/2011 | Lutz et al. |
| 8,317,350 | B2 | 11/2012 | Friedman et al. |
| 8,328,381 | B2 | 12/2012 | Dixon et al. |
| 8,496,366 | B2 | 7/2013 | Leong |
| 8,506,108 | B2 | 8/2013 | Friedman et al. |
| 8,517,558 | B2 | 8/2013 | Domori et al. |
| 8,820,955 | B2 | 9/2014 | Dixon et al. |
| 8,827,483 | B2 | 9/2014 | Dixon et al. |
| 9,028,088 | B2 | 5/2015 | Vanko et al. |
| 9,328,915 | B2 | 5/2016 | Vanko et al. |
| 9,352,458 | B2 | 5/2016 | Friedman et al. |
| 9,644,837 | B2 | 5/2017 | Vanko et al. |
| 9,682,466 | B2 | 6/2017 | Wessel |
| 10,040,181 | B2 | 8/2018 | Fu et al. |
| 10,052,733 | B2 | 8/2018 | Ely et al. |
| 2004/0027117 | A1 | 2/2004 | Spingler |
| 2005/0188498 | A1 | 9/2005 | Thanner et al. |
| 2005/0210643 | A1 | 9/2005 | Mezei et al. |
| 2006/0163955 | A1 | 7/2006 | Maruyama et al. |
| 2007/0248307 | A1 | 10/2007 | Page et al. |
| 2008/0130264 | A1 | 6/2008 | Page et al. |
| 2009/0298630 | A1 | 12/2009 | Mineno et al. |
| 2010/0178856 | A1 | 7/2010 | Cruz |
| 2010/0294001 | A1 | 11/2010 | Page et al. |
| 2010/0328929 | A1 | 12/2010 | Lutz et al. |
| 2011/0058356 | A1 | 3/2011 | Friedman et al. |
| 2011/0199756 | A1 | 8/2011 | Oomori et al. |
| 2012/0125648 | A1 | 5/2012 | Schadow et al. |
| 2013/0236154 | A1 | 9/2013 | Page et al. |
| 2013/0244845 | A1 | 9/2013 | Nagy et al. |
| 2014/0068952 | A1 | 3/2014 | Soreo et al. |
| 2014/0072459 | A1 | 3/2014 | Kalavsky |
| 2014/0190716 | A1 | 7/2014 | Sugiura et al. |
| 2014/0327215 | A1* | 11/2014 | Thorson .................... B27B 5/30 279/141 |
| 2017/0008160 | A1 | 1/2017 | Simma |
| 2017/0106523 | A1 | 4/2017 | Pan |
| 2017/0203421 | A1 | 7/2017 | Vanko et al. |
| 2018/0029215 | A1 | 2/2018 | Zhong et al. |
| 2018/0126538 | A1 | 5/2018 | Qiu et al. |
| 2019/0091888 | A1 | 3/2019 | Thornson et al. |
| 2022/0021266 | A1 | 1/2022 | Wyler et al. |
| 2022/0347829 | A1 | 11/2022 | Holly et al. |

FOREIGN PATENT DOCUMENTS

| | | | | |
|---|---|---|---|---|
| CN | 204997585 | U | 1/2016 | |
| DE | 2340303 | A1 | 2/1975 | |
| DE | 19650428 | A1 | 6/1998 | |
| DE | 102009002967 | A1 | 11/2010 | |
| DE | 102012224448 | A1 | 7/2014 | |
| DE | 102014203328 | A1 | 8/2015 | |
| DE | 202015103986 | U1 | 8/2015 | |
| EP | 3117964 | A1 | 1/2017 | |
| GB | 2429181 | B | 7/2008 | |
| JP | 2008062344 | A | 3/2008 | |
| JP | 2011000654 | A | 1/2011 | |
| JP | 2016140948 | A | 8/2016 | |
| JP | 2018094651 | A | 6/2018 | |
| KR | 1020070108820 | A | 11/2007 | |
| WO | 2004099622 | A1 | 11/2004 | |
| WO | WO-2007073981 | A1 * | 7/2007 | ............. B24B 23/00 |
| WO | 2015161997 | A1 | 10/2015 | |
| WO | 2016066294 | A1 | 5/2016 | |

OTHER PUBLICATIONS

Top China Supplier, “Motor Bearing Custom Deep Groove Ball Bearing Cage,” available at <https://www.topchinasupplier.com/wholesale/Motor-Bearing-Custom-Deep-Groove-Ball-Bearing-Cage_229403/> web page visited Jun. 16, 2020 (7 pages).
Extended European Search Report for Application No. 21822248.7 dated Jun. 17, 2024 (7 pages).

* cited by examiner

OSCILLATING POWER TOOL

CROSS-REFERENCE TO RELATED APPLICATIONS

This application is a national stage filing under 35 U.S.C. § 371 of International Application No. PCT/US2021/036707 filed on Jun. 10, 2021, which claims foreign priority to Chinese Patent Application No. 202021094627.5 filed on Jun. 12, 2020, the entire contents of which are incorporated herein by reference.

TECHNICAL FIELD

The present invention relates to power tools driven by an electric motor, and more specifically to oscillating power tools.

BACKGROUND

Power tools utilize the rotation of a motor to provide torque for operations such as cutting, sanding, grinding, removing material, drilling, driving fasteners, and the like. One exemplary power tool is an oscillating power tool.

Oscillating power tools can be utilized with various accessories, such as blades and sanding or grinding pad attachments, for performing different functions. For example, a plunge cut blade may be attached to the output, or tool/accessory holder, of the oscillating tool to perform a plunge cut. Then, a user may remove the plunge cut blade and attach a sanding pad to the tool holder for performing a sanding operation. Conventionally, the accessories can be interchanged by inserting and removing a fastener, such as a screw, which may be tightened with a tool, such as a hex key, to provide a clamping force to secure the accessory to the tool holder.

SUMMARY OF THE INVENTION

In one aspect, the invention provides an oscillating power tool including an outer housing having a head portion and a handle portion extending therefrom, and an inner housing positioned within the outer housing. A motor and a drive mechanism is supported by the inner housing. The drive mechanism includes an output shaft that is rotational in an oscillating manner and that defines an output axis. A damping element is positioned between the inner housing and the outer housing through which the inner housing is mounted to the outer housing, thereby attenuating vibration transmitted to the outer housing from the inner housing. An over-travel limit member is positioned between the inner housing and the outer housing. In response to relative movement between the inner housing and the outer housing while the oscillating power tool is in use, the over-travel limit member is configured to prevent direct contact between the inner housing and the outer housing, inhibiting vibration produced by the motor and/or the drive mechanism from bypassing the damping element.

In one embodiment of the first aspect, the over-travel limit member is positioned in the head portion.

In one embodiment of the first aspect, the over-travel limit member is configured as a single, annular elastic band positioned around an outer circumference of the inner housing.

In one embodiment of the first aspect, the over-travel limit member is one of at least two discrete elements. The at least two discrete elements are spaced from each other about an interior surface of the head portion.

In one embodiment of the first aspect, each discrete element is configured as an elastic pad.

In one embodiment of the first aspect, the over-travel limit member is fixed to the inner housing or the outer housing.

In one embodiment of the first aspect, the over-travel limit member includes a rib received within a corresponding groove in the inner housing for fixing the over-travel limit member to the inner housing.

In one embodiment of the first aspect, an inner surface of the outer housing defines an interior recess. The over-travel limit member is retained in the interior recess for fixing the over-travel limit member to the outer housing.

In one embodiment of the first aspect, the over-travel limit member is configured to limit lateral movement of the inner housing relative to the outer housing in a direction transverse to the output axis.

In one embodiment of the first aspect, the oscillating power tool further comprises a clamping mechanism for releasably coupling a tool element to the output shaft. The clamping mechanism includes a clamping actuator operable by a user to adjust the clamping mechanism between a locking state in which the tool element is secured to the output shaft, and a release state in which the tool element may be removed from the output shaft. The head portion of the outer housing includes an elongated opening in which the clamping actuator is recessed, thereby forming a gap between the clamping actuator and an outer periphery of the head portion.

In a second aspect, the invention provides an oscillating power tool including an outer housing having a head portion and a handle portion extending therefrom, and an inner housing positioned within the outer housing. A motor and a drive mechanism is supported by the inner housing. The drive mechanism includes an output shaft that is rotational in an oscillating manner and that defines an output axis. A damping element is positioned between the inner housing and the outer housing through which the inner housing is mounted to the outer housing, thereby attenuating vibration transmitted to the outer housing from the inner housing. A clamping mechanism is provided for releasably coupling a tool element to the output shaft. The clamping mechanism includes a clamping actuator operable by a user to adjust the clamping mechanism between a locking state in which the tool element is secured to the output shaft, and a release state in which the tool element may be removed from the output shaft. The head portion of the outer housing includes an elongated opening in which the clamping actuator is recessed, thereby forming a gap between the clamping actuator and an outer periphery of the head portion.

In one embodiment of the second aspect, the head portion extends along the output axis between a first end and a second end opposite the first end, the tool element positionable adjacent the first end, the second end having the elongated opening.

In one embodiment of the second aspect, the head portion includes a projection extending outwardly from a surface of the outer housing away from the first end, the projection at least partially defining the elongated opening.

In one embodiment of the second aspect, the elongated opening has a first length measured between a first end and a second end opposite the first end. The clamping actuator has a second length that is less than the first length.

In one embodiment of the second aspect, the second length is selected such that a space is defined between an end of the clamping actuator and the second end of the elongated opening. The space is sized to receive a finger.

In one embodiment of the second aspect, the clamping mechanism includes a biasing member configured to apply a clamping force to the tool element when the clamping mechanism is in the locking state, and the clamping actuator is configured to release the clamping force when the clamping mechanism is in the release state.

In a third aspect, the invention provides an oscillating power tool including an outer housing having a head portion and a handle portion extending therefrom, and an inner housing positioned within the outer housing. A motor and a drive mechanism is supported by the inner housing. The drive mechanism includes an output shaft that is rotational in an oscillating manner and that defines an output axis. A damping element is positioned between the inner housing and the outer housing through which the inner housing is mounted to the outer housing, thereby attenuating vibration transmitted to the outer housing from the inner housing. A clamping mechanism is provided for releasably coupling a tool element to the output shaft. The clamping mechanism includes a clamping actuator operable by a user to adjust the clamping mechanism between a locking state in which the tool element is secured to the output shaft, and a release state in which the tool element may be removed from the output shaft. An over-travel limit member is positioned between the inner housing and the outer housing. In response to relative movement between the inner housing and the outer housing while the oscillating power tool is in use, the over-travel limit member is configured to prevent direct contact between the inner housing and the outer housing, inhibiting vibration produced by the motor and/or the drive mechanism from bypassing the damping element. The head portion of the outer housing includes an elongated opening in which the clamping actuator is recessed, thereby forming a gap between the clamping actuator and an outer periphery of the head portion.

In one embodiment of the third aspect, the over-travel limit member is positioned in the head portion.

In one embodiment of the third aspect, the over-travel limit member is fixed to the inner housing or the outer housing.

In one embodiment of the third aspect, the head portion extends along the output axis between a first end and a second end opposite the first end, the tool element positionable adjacent the first end, the second end having the elongated opening.

Any feature(s) described herein in relation to one aspect or embodiment may be combined with any other feature(s) described herein in relation to any other aspect or embodiment, as appropriate and applicable.

Other features and aspects of the invention will become apparent by consideration of the following detailed description and accompanying drawings.

DETAILED DESCRIPTION

Figure 1:
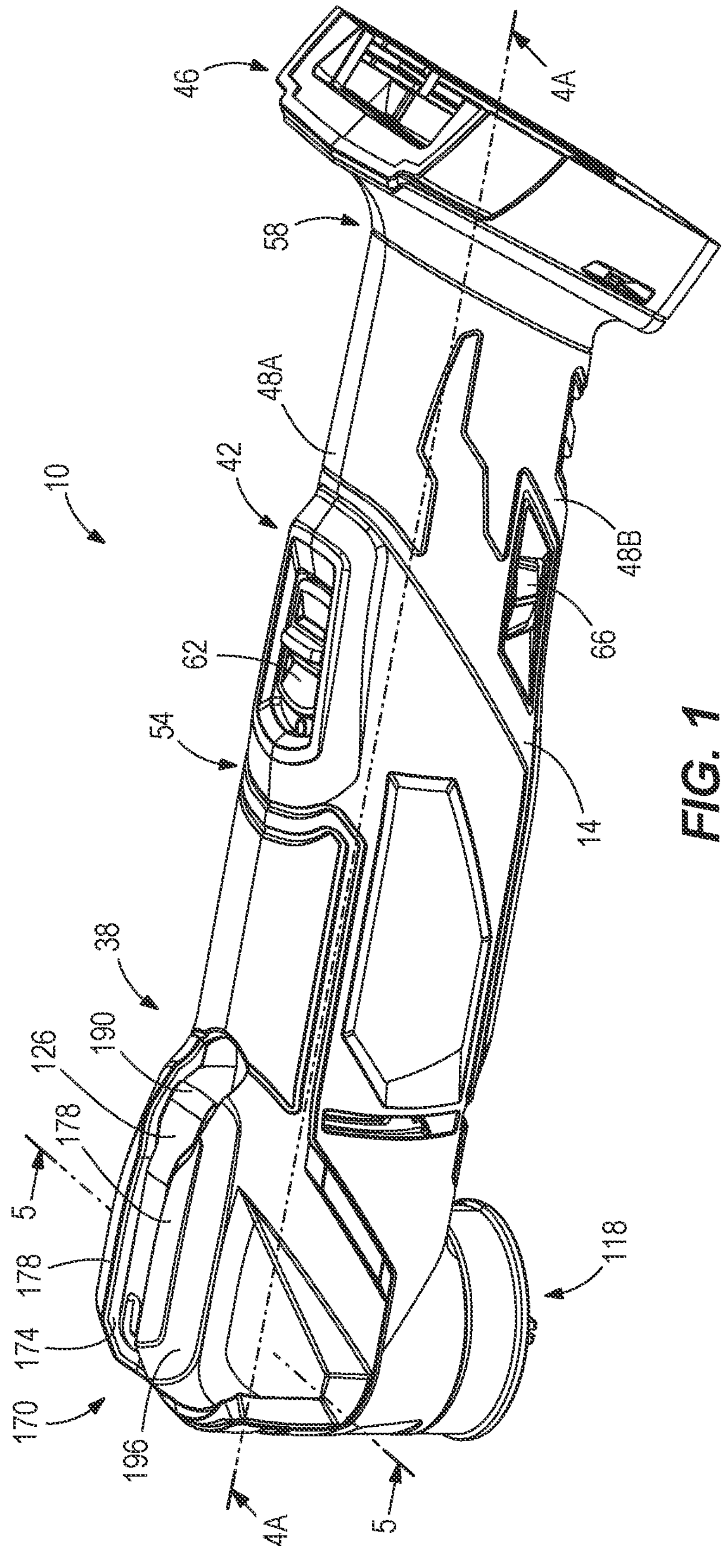
FIG. 1 is a perspective view of a power tool according to one embodiment of the invention.
Figure 2:
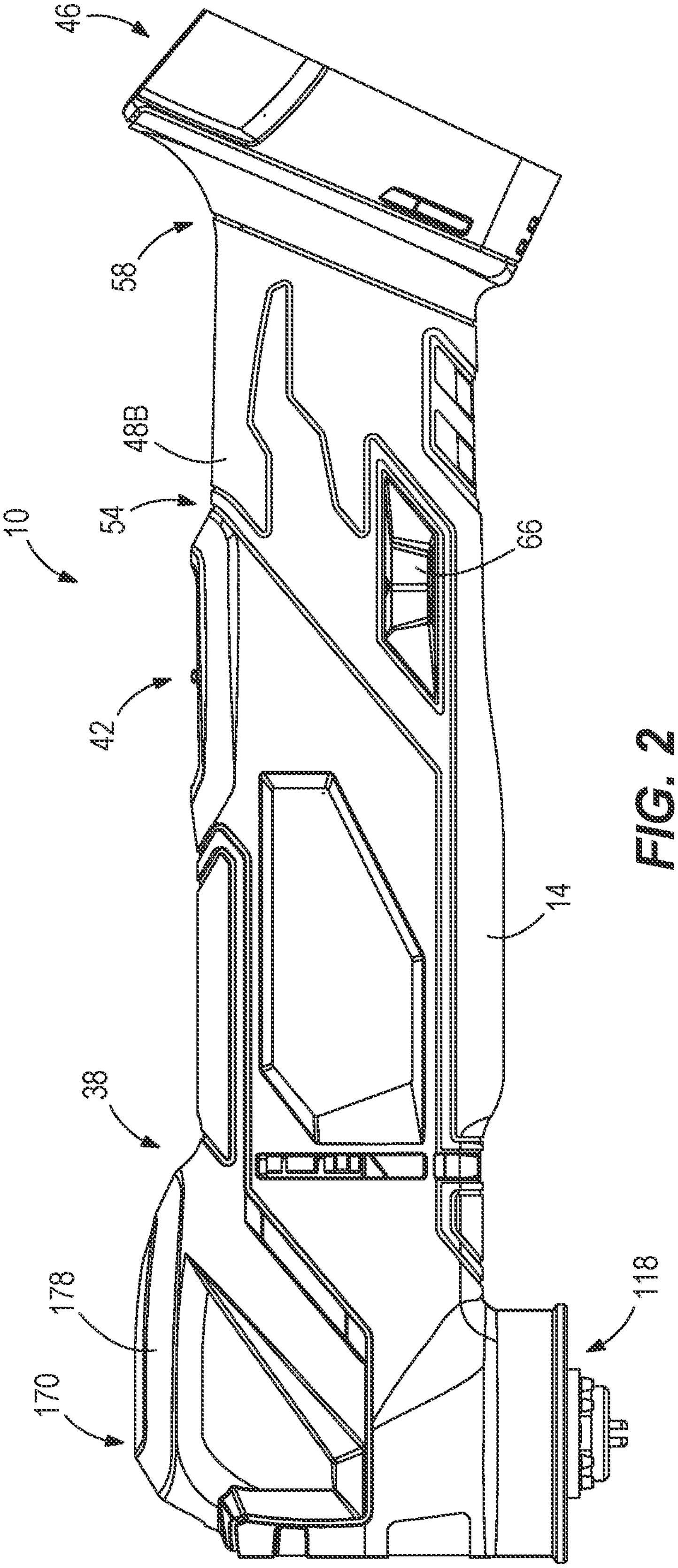
FIG. 2 is a side view of the power tool of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1-8 illustrate a power tool 10, such as an oscillating tool, according to one embodiment of the invention. With reference to FIGS. 1-4B, the power tool 10 includes an outer housing 14, an electric motor 18, a drive mechanism 22, an output element 26 (i.e., cutting blade; FIG. 4B), a clamping mechanism 30, and a power source, such as a battery pack (not shown), for powering the motor 18.

The outer housing 14 includes a head portion 38 and a handle portion 42 extending therefrom. The outer housing 14 also includes a battery support portion 46 positioned at an end of the handle portion 42 opposite the head portion 38. The head portion 38 is configured to support the drive mechanism 22, the clamping mechanism 30, and the motor 18. The handle portion 42 is configured to be grasped by a user during operation of the power tool 10. Alternatively, or further, a user may grasp the head portion 38 during operation. In the illustrated embodiment, the outer housing 14 is formed by two clamshell halves 48A, 48B that are coupled together to completely enclose the motor 18 and the drive mechanism 22. When connected, the clamshell halves 48A, 48B define the head portion 38, the handle portion 42, and the battery support portion 46. In other embodiments, the outer housing 14 may be formed by one or more pieces or sections that when coupled together completely enclose at least the head portion 38 and the handle portion 42. Accordingly, the drive mechanism 22 is not exposed to the environment.

Figure 4A:
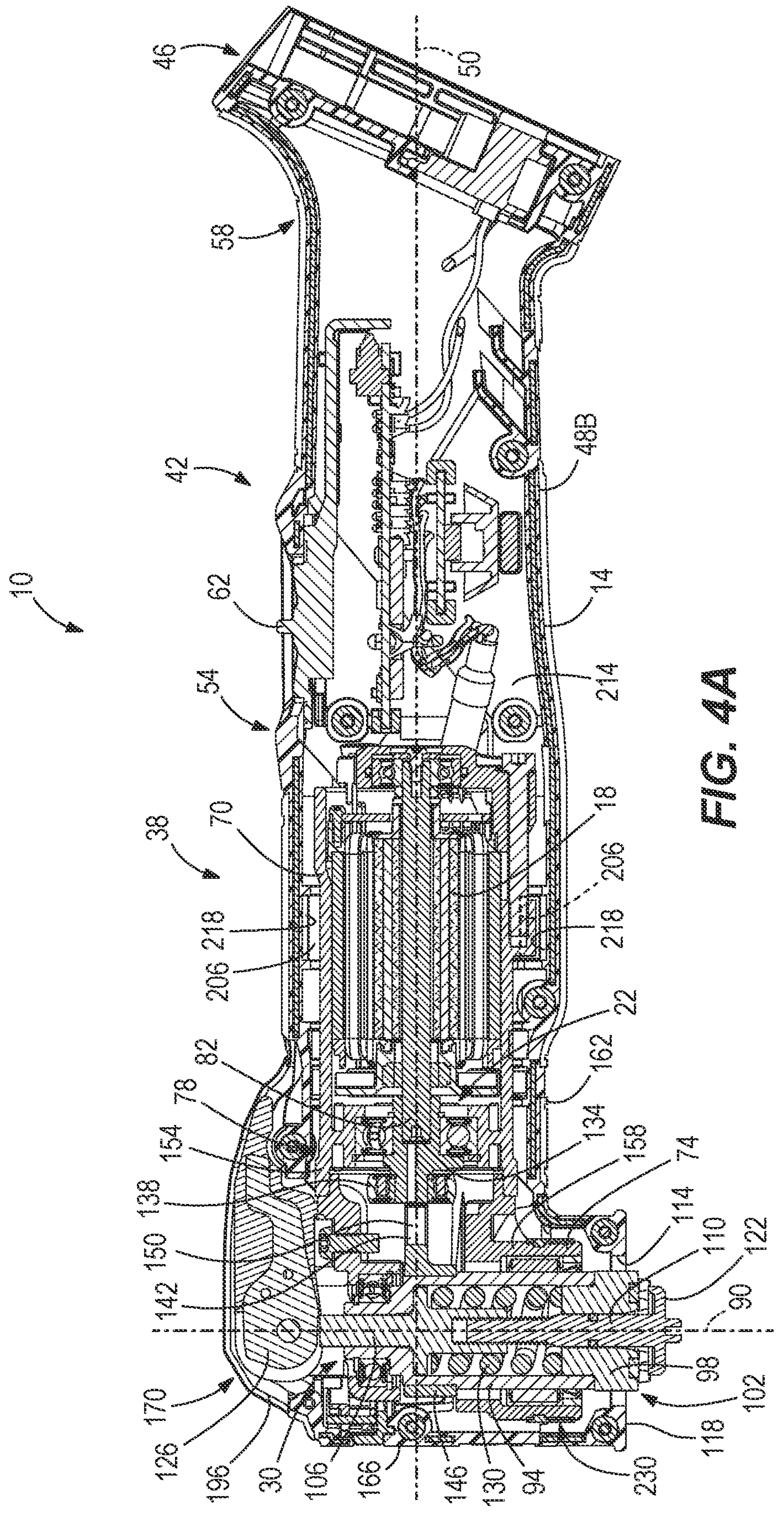
FIG. 4A is a side cross-sectional view of the power tool of FIG. 1 taken along lines 4A-4A in FIG. 1.

With reference to FIG. 4A, the motor 18 defines a motor axis 50 of the power tool 10. The handle portion 42 extends along the motor axis 50 between a first end 54 and a second, opposite end 58. The head portion 38 is positioned adjacent the first end 54, and the battery support portion 46 is positioned adjacent the second end 58.

An actuator 62 is coupled with the handle portion 42 of the outer housing 14 proximate the first end 54 for switching the motor 18 between an on (i.e., energized) position and an off position. In addition, the tool 10 includes a separate actuator 66 (FIG. 1) on the handle portion 42 for changing the motor speed. In other embodiments, the on/off actuator 62 may additionally be operable to switch the motor 18 between various speeds of operation. In the illustrated embodiment, the actuator 62 is slideable with respect to the outer housing 14 in a direction generally parallel with the motor axis 50. In other embodiments, the actuator 62 may be moveable in other directions and may have other configurations, such as a trigger-style actuator, a depressible button, a lever, a rotating actuator, a paddle actuator, etc.

The battery support portion 46 is configured to support the battery pack on the outer housing 14. The battery pack is configured to be connected to the battery support portion 46 of the outer housing 14 and electrically coupled to the motor 18. During operation of the power tool 10, the battery pack supplies power to the motor 18 to energize the motor 18.

Figure 6:
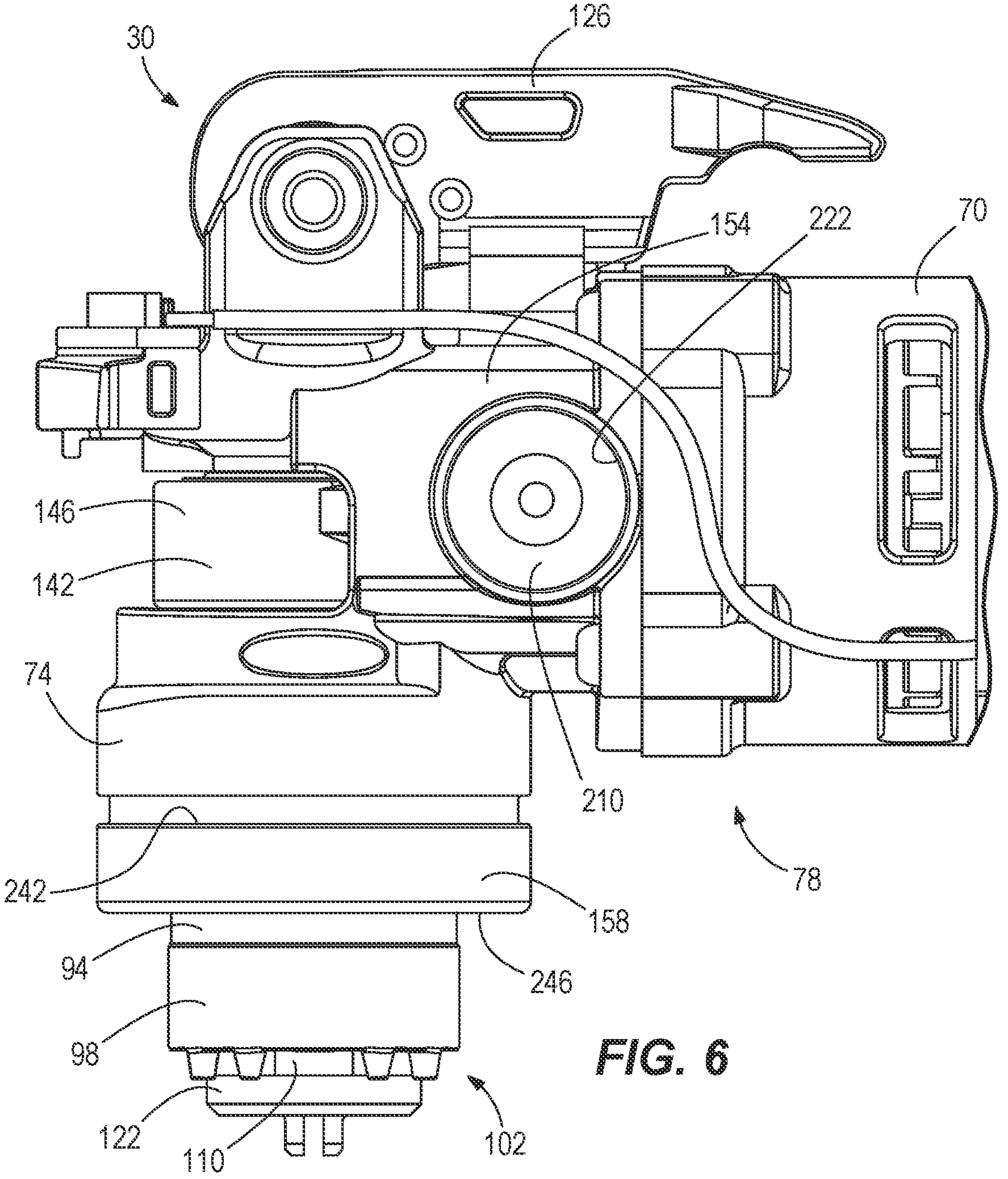
FIG. 6 is a side view of a portion of the power tool of FIG. 1, illustrating an inner head portion of the power tool of FIG. 1.

With reference to FIGS. 4A and 6, the motor 18 and the drive mechanism 22 are positioned substantially within the outer housing 14 in front of the handle portion 42. The motor 18 is positioned within a motor case 70. The drive mechanism 22 is positioned within a gear case 74 adjacent the motor case 70. In the illustrated embodiment, the motor case 70 and the gear case 74 are formed by separate pieces. In other embodiments, the motor case 70 and the gear case 74 may be formed by one piece. The motor case 70 and the gear case 74, collectively, are hereinafter referred to as the "inner housing 78" of the power tool 10. The inner housing 78 generally has an "L" shape. The inner housing 78 is positioned inside and is supported by the outer housing 14 for limited relative movement therewith, as further discussed below.

The motor 18 includes a drive shaft 82. The drive mechanism 22 is coupled to the motor 18 via the drive shaft 82. The drive mechanism 22 converts rotational motion of the drive shaft 82 into oscillating rotational motion of the output element 26 about an output axis 90. In other embodiments, the power tool 10 may have a drive mechanism that rotates, reciprocates, or imparts an orbital motion to the output element 26.

Figure 4B:
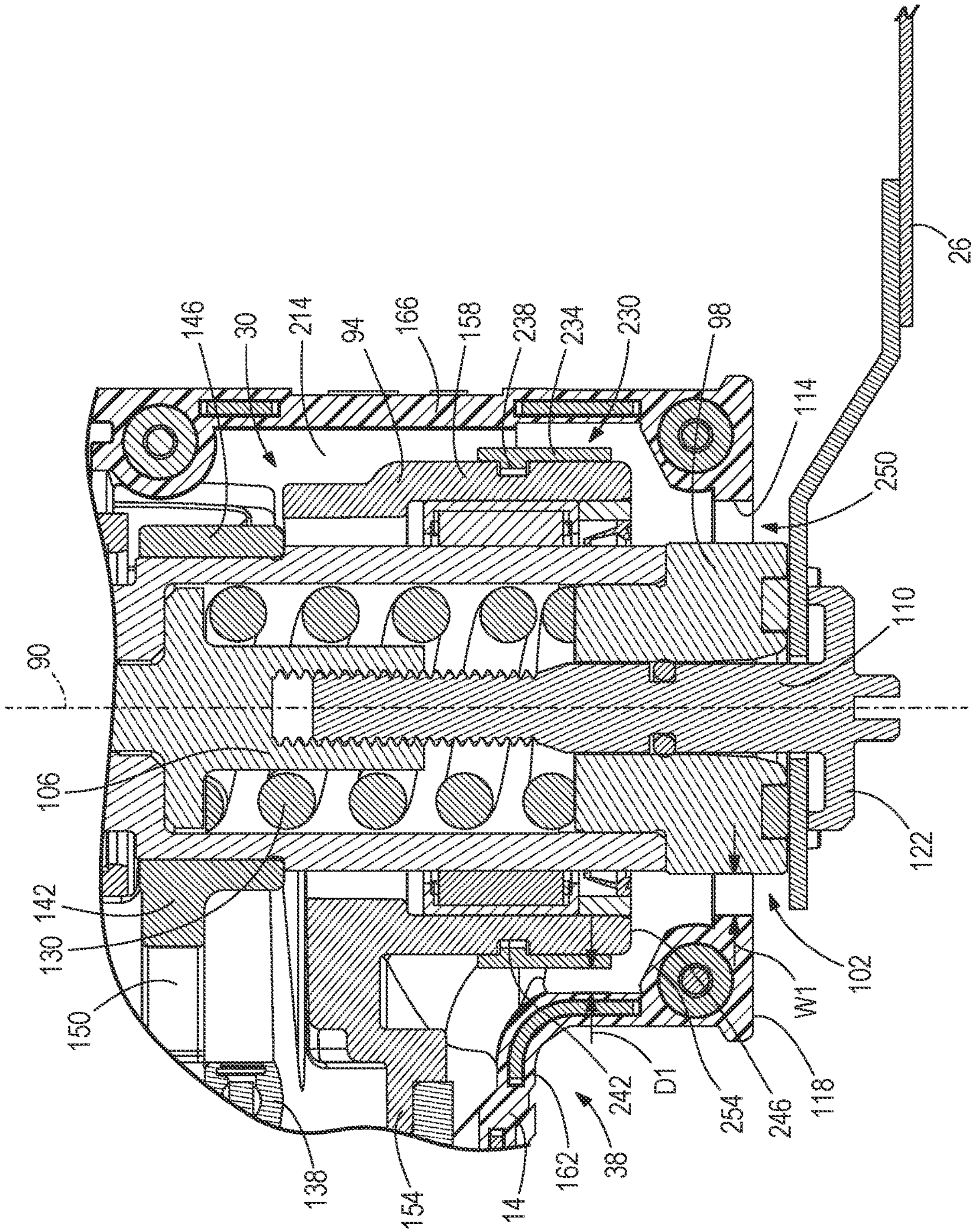
FIG. 4B is another side cross-sectional view of a portion of the power tool of FIG. 4A.

With reference to FIG. 4B, the output element 26 is coupled to an output shaft, or spindle 94, of the drive mechanism 22. The output element 26 is located at an opposite end of the outer housing 14 from the battery support portion 46, but may alternatively be located in other locations on the outer housing 14 relative to the battery support portion 46. In the illustrated embodiment, the spindle 94 defines an output axis 90 substantially perpendicular to the motor axis 50. When energized, the motor 18 drives the drive mechanism 22 to oscillate the spindle 94 and the output element 26 about the output axis 90. In some embodiments, the output element 26 may be a cutting blade or a different type of blade such as a scraper blade, a circular blade, a semi-circular blade, etc., or a different type of element such as a sanding pad, a grinding element, etc.

With reference to FIGS. 4A and 4B, the clamping mechanism 30 is operable to clamp the output element 26 to the spindle 94 without using a separate tool (e.g., a hex key). The clamping mechanism 30 includes the spindle 94 having an accessory holder 98 disposed at a distal end thereof, a plunger 106, and a threaded clamping shaft 110 disposed within the spindle 94, which is hollow in the illustrated embodiment. The spindle 94 terminates at a free end 102 with the accessory holder 98. The accessory holder 98 is configured to receive the output element 26, and the clamping mechanism 30 clamps the output element 26 to the accessory holder 98. The spindle 94 extends through an opening 114 (FIG. 4B) defined by an output end 118 of the head portion 38 of the outer housing 14. Accordingly, the accessory holder 98 at the free end 102 of the spindle 94 is external to the head portion 38 of the outer housing 14.

With particular reference to FIG. 4B, the threaded clamping shaft 110 includes a clamping flange 122 at a distal end thereof for clamping the output element 26 to the accessory holder 98 for oscillating motion with the spindle 94. The clamping shaft 110 also extends through the opening 114 such that clamping flange 122 is also external to the head portion 38 of the outer housing 14. A user may thread the threaded clamping shaft 110 into the plunger 106 to hand tighten the clamping flange 122 against the output element 26. The clamping mechanism 30 also includes a clamping actuator 126, such as a lever (FIG. 4A), configured to apply and release a clamping force from a biasing member 130, such as a spring. In a first position of the clamping actuator 126 (FIG. 4B), the biasing member 130 applies the clamping force pulling the clamping flange 122 toward the accessory holder 98 to clamp the output element 26 tightly. Accordingly, the first position may be referred to as a locking state of the clamping mechanism 30. In a second position (not shown) of the clamping actuator 126, the plunger 106 compresses the biasing member 130 to remove the clamping force from the accessory holder 98, such that the threaded clamping shaft 110 can be unthreaded and removed to release the output element 26. Accordingly, the second position may be referred to as a release state of the clamping mechanism 30.

With continued reference to FIGS. 4A and 4B, the drive mechanism 22 includes an eccentric shaft 134 coupled to the motor drive shaft 82 and offset from the motor axis 50, an eccentric bearing 138 coupled to the eccentric shaft 134, and a forked yoke 142. The forked yoke 142 is coupled fixedly to the spindle 94 by way of a sleeve portion 146, and the forked yoke 142 and spindle 94 are collectively mounted for oscillating rotation about the output axis 90. The forked yoke 142 does not slide or move with respect to the outer housing 14 other than to oscillate in a rotating fashion about the output axis 90.

More specifically, the forked yoke 142 includes two arms 150 (only one of which is shown in FIGS. 4A-4B) extending from the sleeve portion 146. Each arm 150 engages an outer circumferential surface of the eccentric bearing 138. As the eccentric bearing 138 rotates and wobbles about the motor axis 50, the eccentric bearing 138 pushes each arm 150 in an alternating fashion to cause the forked yoke 142 to oscillate. Thus, the forked yoke 142 oscillates about the output axis 90 to convert the rotary motion of the eccentric bearing 138 about the motor axis 50 into oscillating motion of the spindle 94 and the accessory holder 98 about the output axis 90.

With reference to FIGS. 4A and 6, the gear case 74 includes a first portion 154 configured to receive the eccentric shaft 134, the eccentric bearing 138, and a portion of the forked yoke 142 (i.e., the arms 150). The gear case 74 also includes a second portion 158 configured to support the spindle 94, the output element 26, and the remaining portion of the forked yoke 142 (i.e., the sleeve portion 146). The first portion 154 of the gear case 74 is in facing relationship with a corresponding first portion 162 of the head portion 38 of the outer housing 14. The second portion 158 of the gear case 74 is in facing relationship with a corresponding second portion 166 of the head portion 38 of the outer housing 14.

Figure 3:
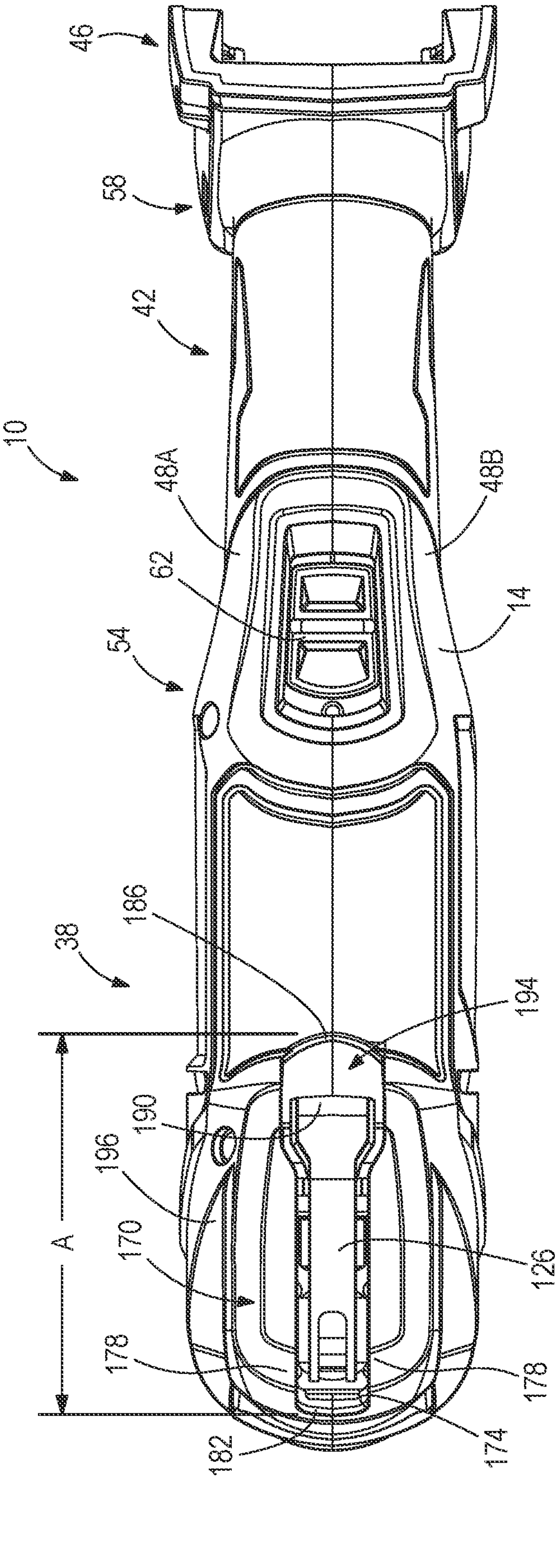
FIG. 3 is a top view of the power tool of FIG. 1.

With reference to FIGS. 1, 3, and 4A, the head portion 38 of the outer housing 14 also includes an actuator end 170 opposite the output end 118. The output axis 90 extends through the output end 118 and the actuator end 170. The actuator end 170 defines an elongated opening 174. In the illustrated embodiment, the opening 174 is defined by the two clamshell halves 48A, 48B. More specifically, each clamshell half 48A, 48B includes a projection 178 extending outwardly away from the output end 118. The projections 178 define the elongated opening 174. The elongated opening 174 is sized to receive the clamping actuator 126 of the clamping mechanism 30.

The clamping actuator 126 is positioned within the elongated opening 174 such that the clamping actuator 126 is recessed within the elongated opening 174. In other words, the projections 178 extend farther along the motor axis 50 than the clamping actuator 126. In addition, the elongated opening 174 has a length A (FIG. 3) measured between a first end 182 of the elongated opening 174 and a second end 186 opposite the first end 182. The length A is selected such that a length of the clamping actuator 126 is less than the length A of the elongated opening 174. The length A is further selected such that there is a space 194 between an end 190 of the clamping actuator 126 and the second end 186 of the elongated opening 174. The space 194 facilitates grasping the recessed clamping actuator 126 by a user when the clamping actuator 126 is in the first (clamped) position. More specifically, the space 194 allows a user to extend a finger into the elongated opening 174 and underneath the end 190 of the clamping actuator 126 to move the clamping actuator 126 from the first position toward the second position. The clamping actuator 126 is recessed within the outer housing 14 such that a gap is formed between the clamping actuator 126 and an outer periphery 196 of the head portion 38 of the outer housing 14, thereby inhibiting or reducing the transfer of vibration produced by the motor 18 and the drive mechanism 22, during operation of the power tool 10, through the clamping mechanism 30 to a user when a user grasps the head portion 38 during operation of the power tool 10. This may reduce user fatigue when the power tool 10 is being operated.

FIGS. 4A-6 illustrate a mount assembly for supporting the inner housing 78, which contains the motor 18 and the drive mechanism 22 therein, within and relative to the outer housing 14. In particular, the mount assembly includes a plurality of vibration damping elements 206, 210 disposed between the inner housing 78 and the outer housing 14. In the illustrated embodiment, the power tool 10 includes a plurality of first damping elements 206 positioned between the motor case 74 and the outer housing 14. The illustrated first damping elements 206 include four first damping elements 206 (only two of which are shown in FIG. 4A) positioned equidistantly and circumferentially about the motor case 70. An inner surface 214 of the outer housing 14 in facing relationship with the motor case 70 includes a plurality of mounting elements 218 (e.g., grooves) configured to receive the respective first damping elements 206. The first damping elements 206 are configured to support the motor case 70 within the outer housing 14 and permit limited movement of the motor case 70 relative to the outer housing 14.

Figure 5:
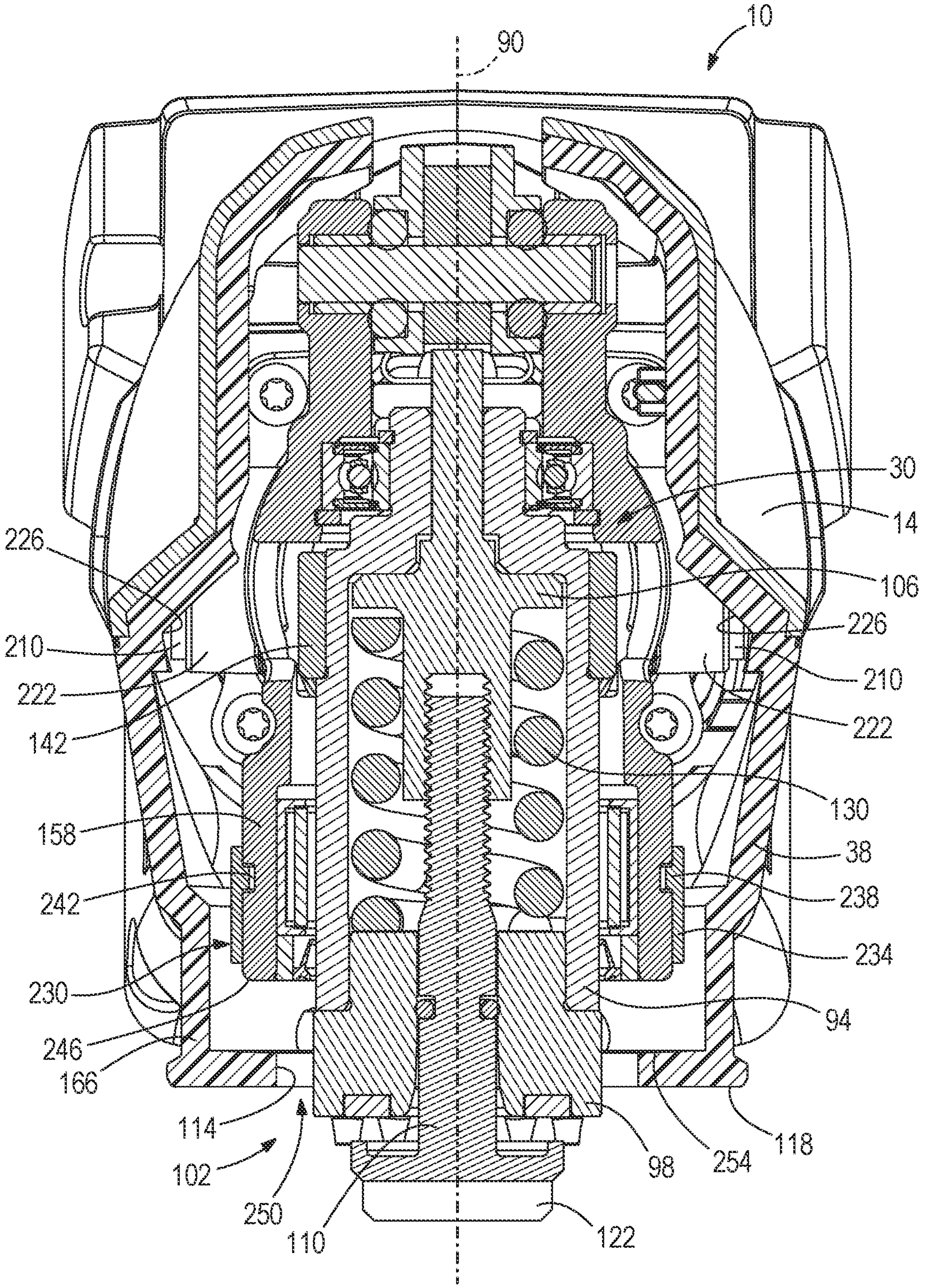
FIG. 5 is a front cross-sectional of the power tool of FIG. 1 taken along lines 5-5 in FIG. 1.

The power tool 10 further includes a plurality of second damping elements 210 positioned between the gear case 74 (i.e., the first portion 154) and the outer housing 14. The illustrated second damping elements 210 includes two second damping elements. The gear case 74 includes a plurality of mounting elements 222 (e.g., recesses) configured to receive the respective second damping elements 210. The inner surface 214 of the outer housing 14 includes corresponding mounting elements 226 (e.g., recesses; FIG. 5) aligned with the gear case mounting elements 222. The illustrated second damping elements 210 are positioned between the mounting elements 222, 226 of the inner and outer housings 78, 14, respectively. The second damping elements 210 are configured to support the gear case 74 within the outer housing 14 and permit limited movement of the gear case 74 relative to the outer housing 14.

The inner housing 78 is configured to move (e.g., displace) relative to the outer housing 14 during operation of the power tool 10. More specifically, the inner housing 78, and the motor 18 and the drive mechanism 22 supported therein, "float" within and relative to the outer housing 14 because the inner housing 78 is not rigidly mounted to the outer housing 14. Rather, the inner housing 78 is mounted to the outer housing 14 via the elastic first and second damping elements 206, 210. The first damping elements 206 and the second damping elements 210 are configured to attenuate vibration transmitted to the outer housing 14 that is produced by the motor 18 and the drive mechanism 22 during operation of the power tool 10.

In addition, by enclosing the inner housing 78 within the head portion 38 of the outer housing 14, vibration produced by the motor 18 and the drive mechanism 22 is prevented from being directly transmitted to a user grasping the head portion 38 of the outer housing 14 while using the tool 10. Moreover, by recessing the clamping actuator 126 within the head portion 38 of the outer housing 14 (and more specifically, within the elongated opening 174), vibration produced by the drive mechanism 22 is prevented from being transmitted from the gear case 74, through the clamping actuator 126, to a user grasping the head portion 38 of the outer housing 14 while using the tool 10. For example, the inner housing 78 may vibrate within the outer housing 14 at a magnitude as high as 11.30 $m/s^2$ (measured using hand-arm vibration (HAV) acceleration rate). In the illustrated embodiment of the power tool 10 with the inner housing 78 enclosed within the outer housing 14 and the clamping actuator 126 recessed within the outer housing 14 so that it remains spaced from the user when grasping the head portion 38, the magnitude of vibration measured at the head portion 38 is 5.0 $m/s^2$ (HAV acceleration rate) or less. In other embodiments of the power tool 10, the magnitude of vibration measured at the head portion 38 is 3.0 $m/s^2$ (HAV acceleration rate). Still further, in other embodiments of the power tool 10, the magnitude of vibration measured at the head portion 38 is 1.85 $m/s^2$ (HAV acceleration rate).

With reference to FIGS. 4B and 6-8, the power tool 10 further includes an over-travel limit member 230 positioned within the outer housing 14 and configured to stop further movement of the inner housing 78 relative to the outer housing 14 beyond a predetermined range of acceptable movement. In the illustrated embodiment, the limit member 230 is positioned within the head portion 38 between the inner housing 78 and the outer housing 14, and more particularly between the second portion 158 of the gear case 74 and the second portion 166 of the outer housing 14. In the illustrated embodiment, the limit member 230 is configured as a single, annular elastic band 234 positioned around an outer circumference of the second portion 158 of the gear case 74. In other embodiments, rather than a single band, the limit member 230 may include two or more discrete elements positioned around an outer circumference of the second portion 158 of the gear case 74.

Figure 7:
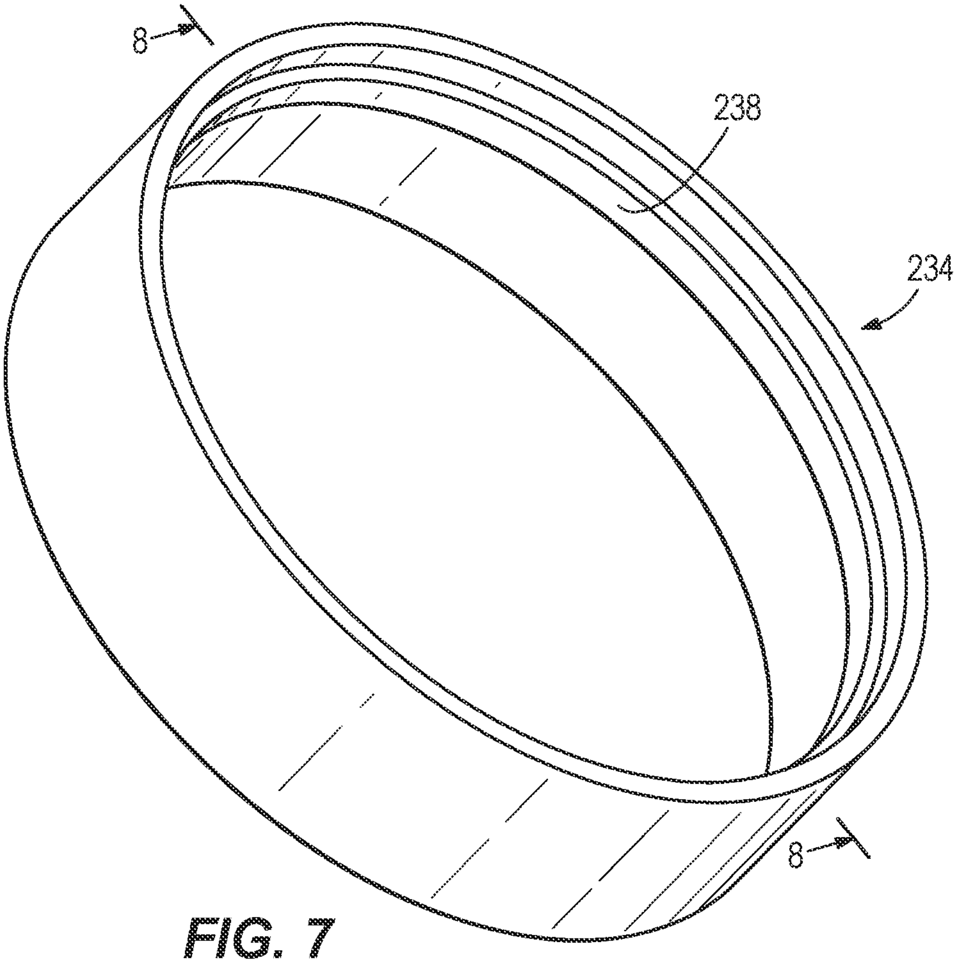
FIG. 7 is a perspective view of a limiting element of the power tool of FIG. 1.
Figure 8:
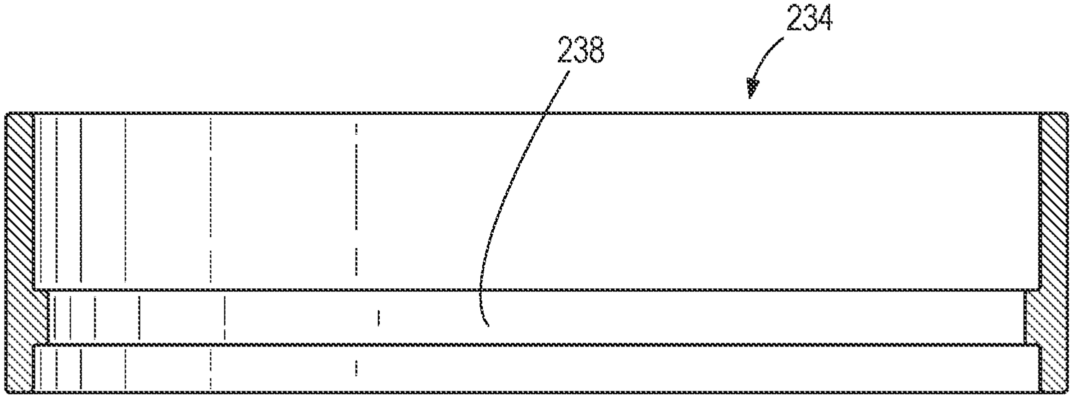
FIG. 8 is a cross-sectional view of the limiting element of FIG. 7.
Figure 9:
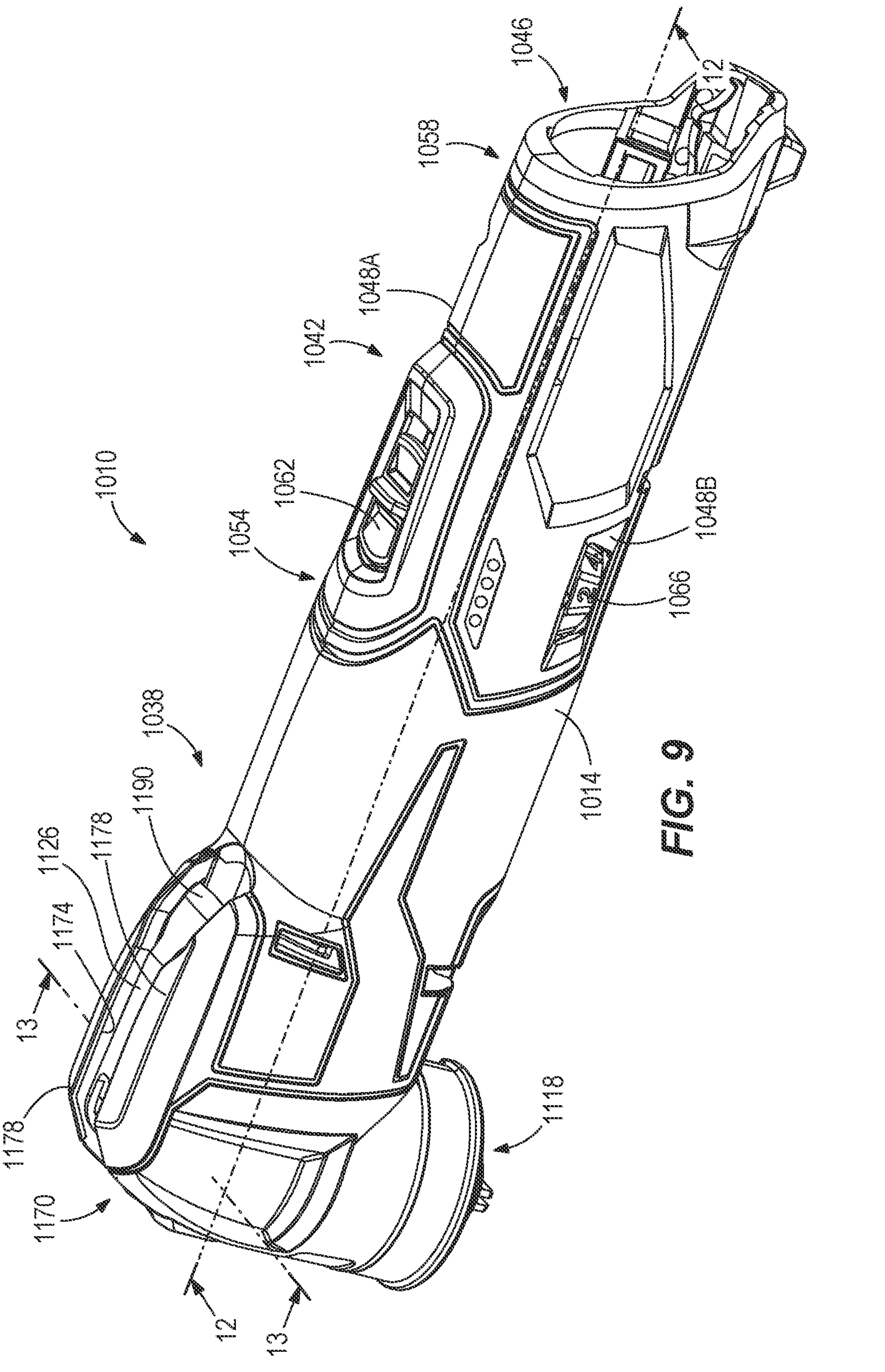
FIG. 9 is a perspective view of a power tool according to another embodiment of the invention.
Figure 10:
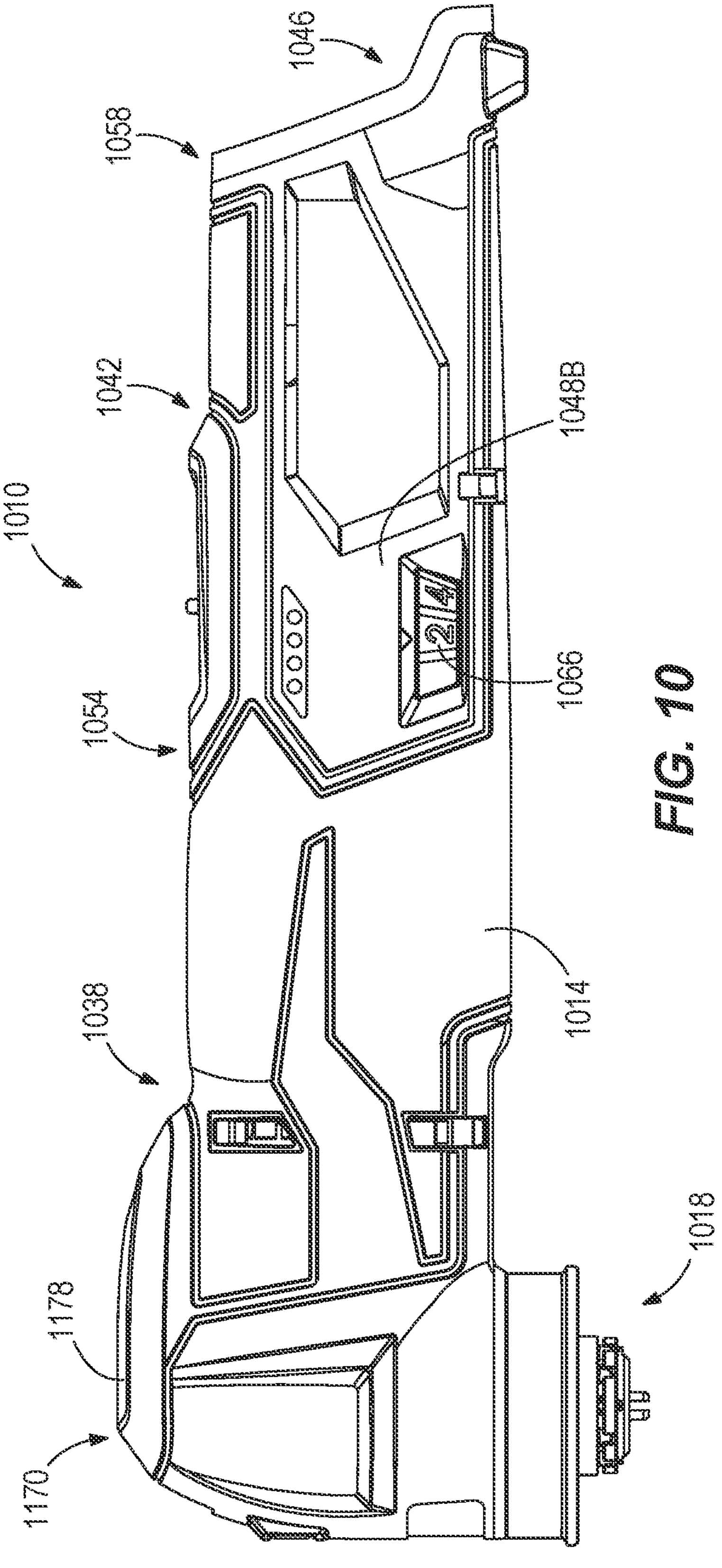
FIG. 10 is a side view of the power tool of FIG. 9.
Figure 11:
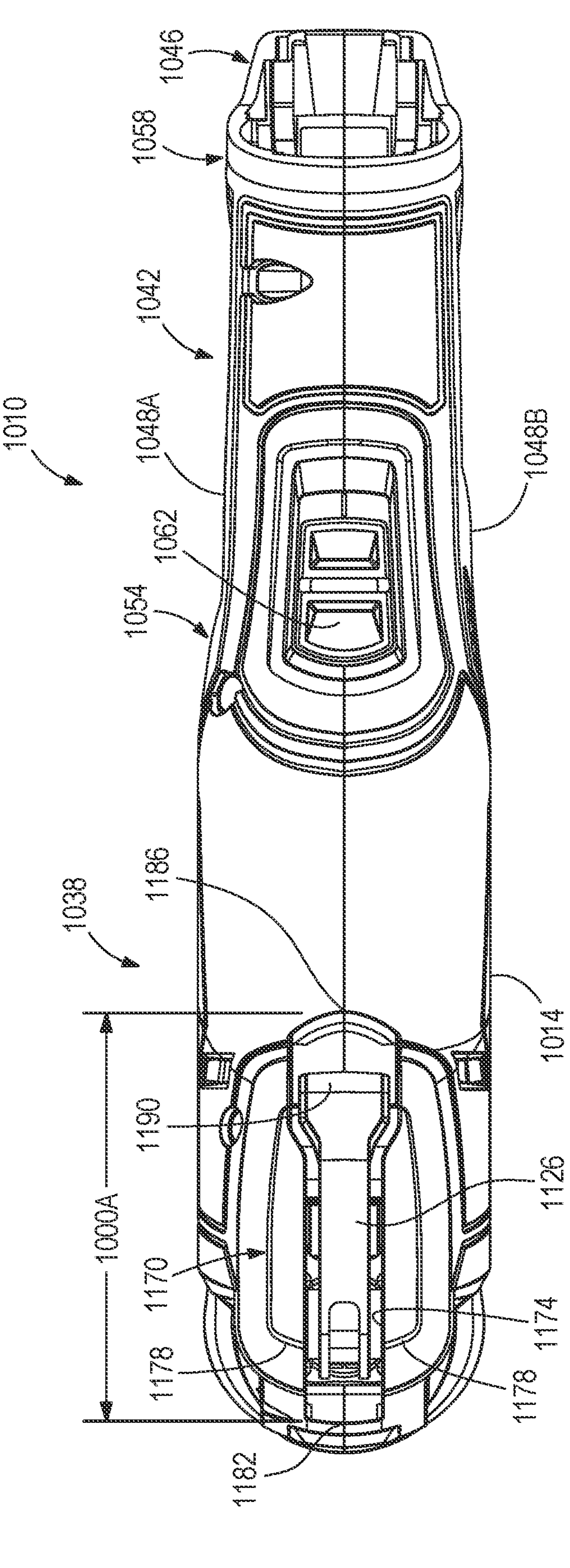
FIG. 11 is a top view of the power tool of FIG. 9.
Figure 12:
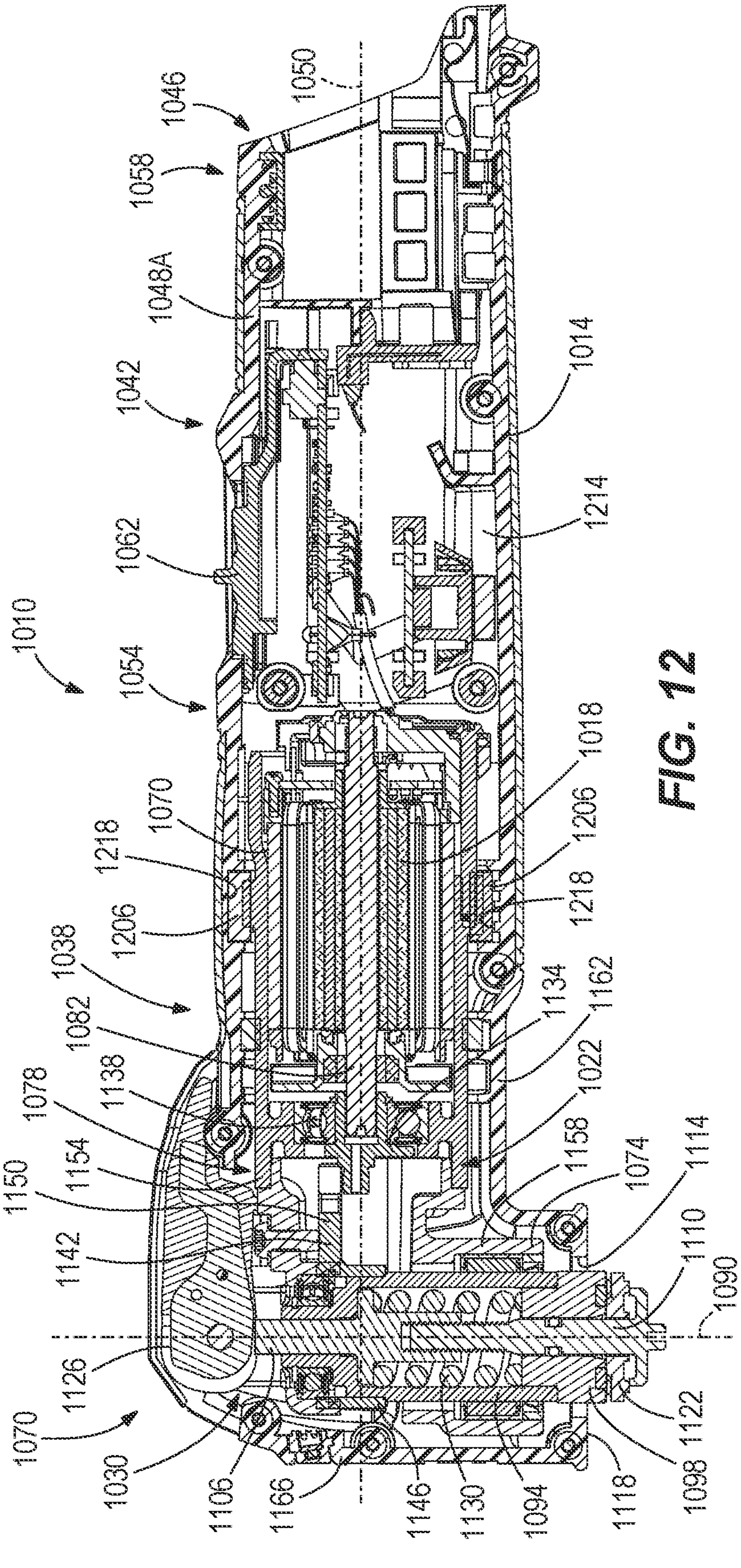
FIG. 12 is a side cross-sectional of the power tool of FIG. 9 taken along lines 12-12 in FIG. 9.

With reference to FIGS. 6-8, the band 234 is fixed relative to the inner housing 78. In the illustrated embodiment, the band 234 includes a rib 238 that is received within a corresponding circumferential groove 242 in the second portion 158 of the gear case 74 (FIG. 6). The rib 238 axially affixes the band 234 to the gear case 74. In other embodiments, the band 234 may be fixed to the interior of the outer housing 14.

The limit member 230 is configured to limit lateral movement of the inner housing 78 relative to the outer housing 14 in a direction transverse to the output axis 90 (FIG. 4B). More specifically, a reaction force is applied to the tip of the output element 26 by a workpiece as the user presses the output element 26 against a workpiece (via the user's grasp of the outer housing 14). Because the inner housing 78, which supports the output element 26, is capable of floating within the outer housing 14 to attenuate vibration as discussed above, the reaction force produces a moment on the inner housing 78, causing it to pivot or tilt within the outer housing 14. Such tilting of the inner housing 78, in absence of the limit member 230, may cause the inner housing 78 to directly contact the inner surface 214 of the outer housing 14, thereby transmitting vibration to the outer housing 14 that bypasses the damping elements 206, 210. The limit member 230 is configured to inhibit or prevent direct contact between the inner housing 78 and the outer housing 14, thereby ensuring that vibration can only be transmitted to the outer housing 14 via the damping elements 206, 210. In other words, the limit member 230 is configured to inhibit vibration produced by the motor 18 and/or the drive mechanism 22 from bypassing the damping elements 206, 210.

In particular, in the illustrated embodiment as shown in FIG. 4B, an annular gap 250 is defined between the portion of the spindle 94 extending through the opening 114 and the output end 118 of the outer housing 14. The band 234 is positioned on the gear case 74 such that the distance D1 that the inner housing 78 may move transverse to the output axis 90 before contacting the inner surface 214 of the outer housing 14 is less than a width W1 of the gap 250. As such, if during use the inner housing 78 tilts within the outer housing 14, causing the band 234 to contact the inner surface 214 of the outer housing 14, the annular gap 250 is maintained with the portion of the spindle 94 extending through the opening 114. Therefore, direct contact between the spindle 94 and the outer housing 14, and thus transmission of vibration that bypasses the damping elements 206, 210 or any attendant wear of the outer housing 14, is prevented.

Furthermore, with continued reference to FIG. 4B, the band 234 may be positioned on the gear case 74 such that movement of the inner housing 78 along the output axis 90 allows the band 234 to contact an inner surface 254 of the output end 118 of the outer housing 14 before an end 246 of the second portion 158 of the gear case 74 contacts the inner surface 254. In particular, the band 234 may extend axially all the way to the end 246. As such, the limit member 230 may be configured to limit axial movement of the inner housing 78 relative to the outer housing 14 in a direction along the output axis 90. Accordingly, direct contact between the gear case 74 and the outer housing 14, and thus transmission of vibration that bypasses the damping elements 206, 210, is prevented.

FIGS. 9-16 illustrate a second embodiment of a power tool 1010, such as an oscillating tool, according to another embodiment of the invention, with like components and features as the first embodiment of the power tool 10 shown in FIGS. 1-8 being labeled with like reference numerals plus "1000". The power tool 1010 is like the power tool 10 and, accordingly, the discussion of the power tool 10 above similarly applies to the power tool 1010 and is not re-stated. Rather, only differences between the power tool 10 and the power tool 1010 are specifically noted herein, such as differences in the over-travel limit device.

The power tool 1010 includes an outer housing 1014 having a head portion 1038, a handle portion 1042, and a battery support portion 1046. The power tool 1010 also includes an inner housing 1078 formed by a motor case 1070 and a gear case 1074. The motor case 1070 supports a motor 1018 and the gear case 1074 supports a drive mechanism 1022. The gear case 1074 includes a first portion 1154 and a second portion 1158 in connection with the first portion 1154. A mount assembly is provided for supporting the inner housing 1078 within and relative to the outer housing 1014. The illustrated mount assembly includes a plurality of vibration damping elements 1206, 1210 disposed between the inner housing 1078 and the outer housing 1014.

Similar to the power tool 10 of the first embodiment, the first portion 1154 of the gear case 1074 is configured to receive an eccentric shaft 1134, an eccentric bearing 1138, and a portion of a forked yoke 1142 (i.e., arms 1150). The second portion 1158 of the gear case 1074 is configured to support a clamping mechanism 1030 including a spindle 1094, an output element 1026, and the remaining portion of the forked yoke 1142 (i.e., a sleeve portion 1146). The first portion 1154 of the gear case 1074 is in facing relationship with a corresponding first portion 1162 of the head portion 1038 of the outer housing 1014. The second portion 1158 of the gear case 1074 is in facing relationship with a corresponding second portion 1166 of the head portion 1038 of the outer housing 1014.

With particular reference to FIGS. 13-16, the power tool 1010 includes an over-travel limit member 1230 positioned within the outer housing 1014 to limit movement of the inner housing 1078. In the illustrated embodiment, the limit member 1230 is positioned within the head portion 1038 between the gear case 1074 and the outer housing 1014. And, in the illustrated embodiment, a plurality of limit members 1230 are positioned between the inner housing 1078 and the outer housing 1014. In the illustrated second embodiment of the power tool 1010, two limit members 1230, each configured as an elastic pad 1234 having a generally rectangular shape, are used. Each pad 1234 is positioned between the second portion 1158 of the gear case 1074 and the second portion 1166 of the head portion 1038 of the outer housing 1014.

Figure 13:
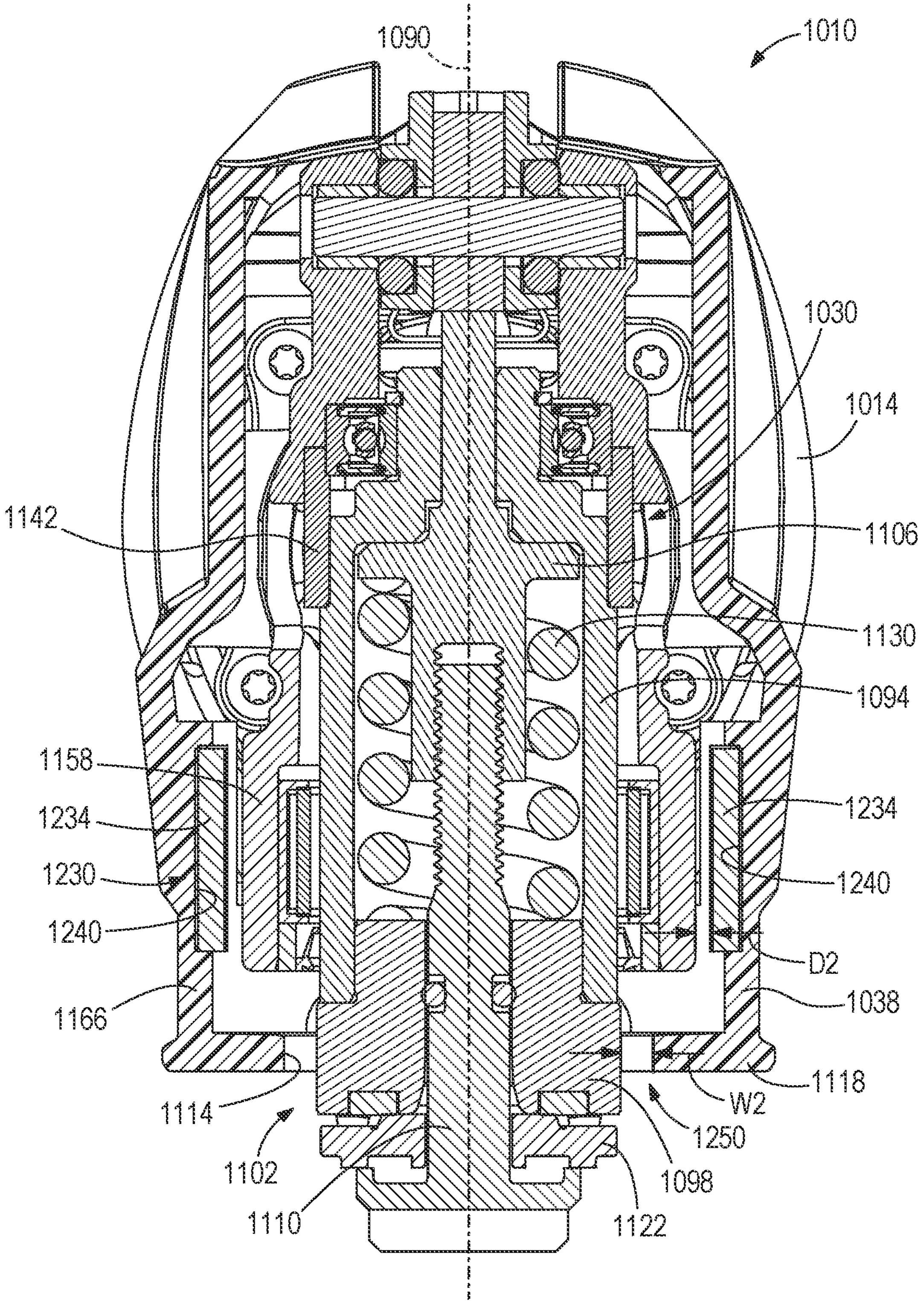
FIG. 13 is a front cross-sectional of the power tool of FIG. 9 taken along lines 13-13 in FIG. 9.
Figure 14:
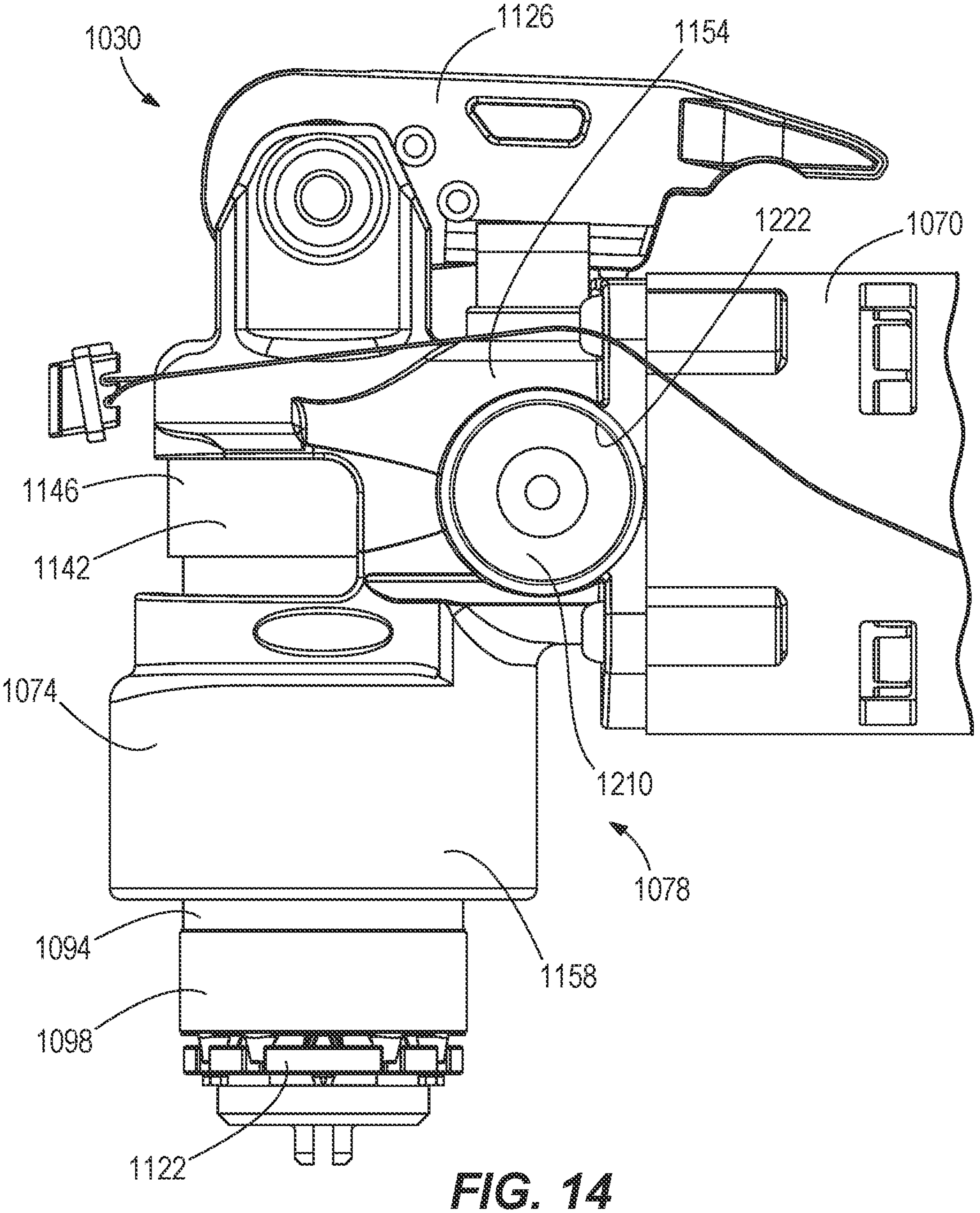
FIG. 14 is a side view of a portion of the power tool of FIG. 9, illustrating an inner head portion of the power tool of FIG. 9.
Figure 15:
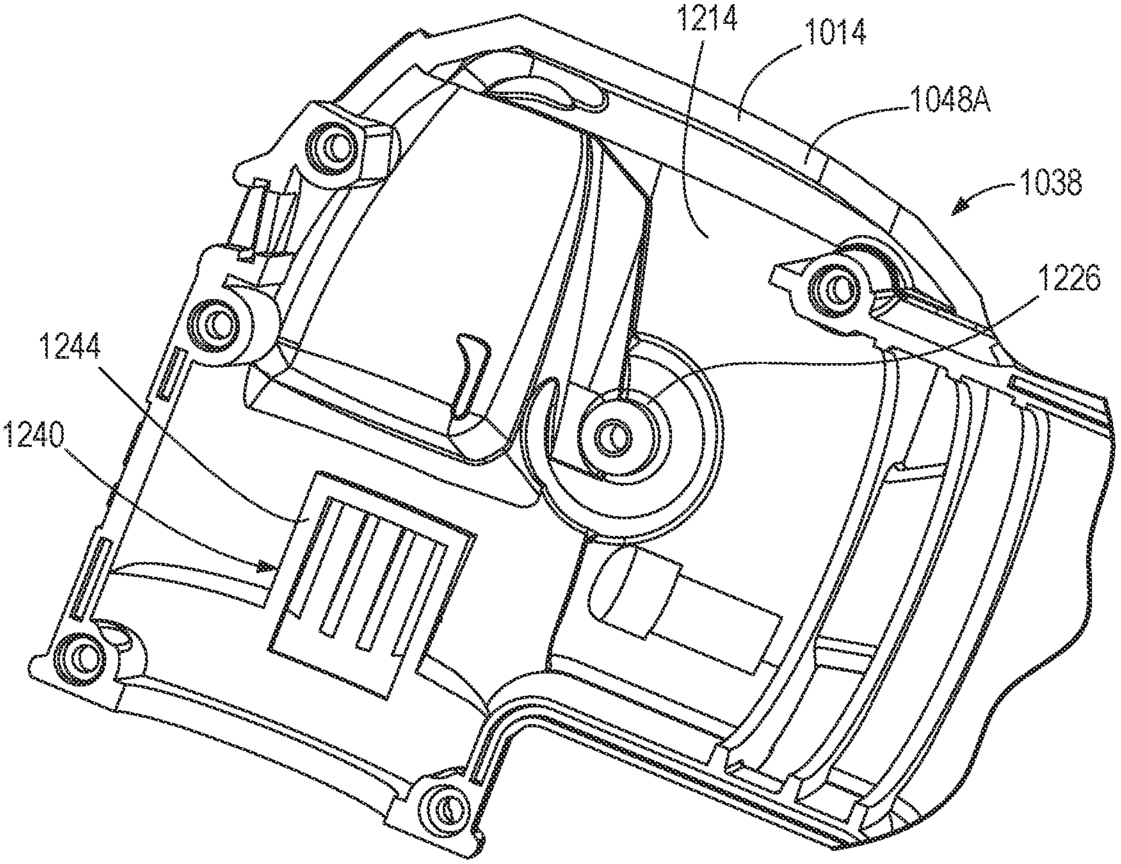
FIG. 15 is a perspective view of an inner portion of an outer housing of the power tool of FIG. 9.
Figure 16:
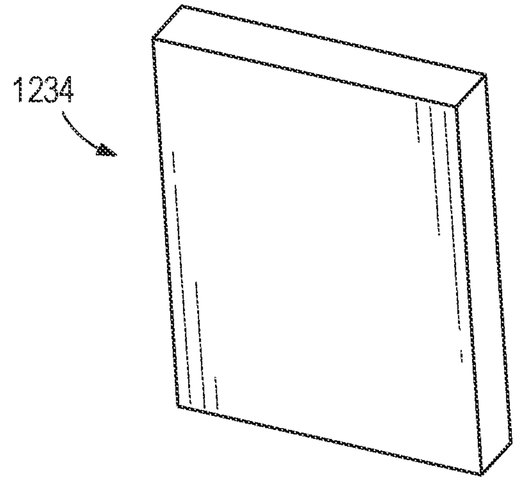
FIG. 16 is a perspective view of a limiting element of the power tool of FIG. 9.

With reference to FIG. 13, the pads 1234 are fixed relative to the outer housing 1014. An inner surface 1214 of the second portion 1158 of the head portion 1038 defines an interior recess 1240 in which a single pad 1234 is received. Each of the interior recesses 1240 is defined by a wall 1244 extending away from the inner surface 1214 toward the gear case 1074. The pads 1234 may be press-fit within the recesses 1240 or otherwise retained within the recesses 1240 using an adhesive, for example.

The limit member 1230 is configured to limit lateral movement between the inner housing 1078 relative to the outer housing 1014 in a direction transverse to the output axis 1090. More specifically, the limit member 1230 is configured to inhibit or prevent direct contact between the inner housing 1078 and the outer housing 1014 when the inner housing 1078 pivots or tilts within the outer housing 1014 by the reaction force, thereby ensuring that vibration can only be transmitted to the outer housing 1014 via the damping elements 1206, 1210.

In particular, like the first embodiment of the power tool 10, an annular gap 1250 (FIG. 13) is defined between the portion of the spindle 1094 extending through the opening 1114 and an output end 1118 of the outer housing 1014. The pads 1234 are respectively positioned on the inner surface 1214 of the outer housing 1014 such that a distance D2 that the inner housing 1078 may move transverse to the output axis 1090 is less than a width W2 of the gap 1250. As such, if during use the inner housing 1078 tilts within the outer housing 1014, causing the inner housing 1078 to contact the pads 1234, the annular gap 1250 is maintained with the portion of the spindle 1094 extending through the opening 1114. Therefore, direct contact between the spindle 1094 and the outer housing 1014, and thus transmission of vibration that bypasses damping elements 1206, 1210 or any attendant wear of the outer housing 1014, is prevented.

Various features of the invention are set forth in the claims.

The invention claimed is:

1. An oscillating power tool comprising:

an outer housing having a head portion and a handle portion extending therefrom;

an inner housing positioned within the outer housing;

a first annular gap defined between the inner housing and the head portion of the outer housing;

a motor and a drive mechanism supported by the inner housing, the drive mechanism including an output shaft that is rotational in an oscillating manner and that defines an output axis, the output shaft extending through an opening in the head portion of the outer housing and defining a second annular gap between the output shaft and the outer housing;

a damping element positioned between the inner housing and the outer housing through which the inner housing is mounted to the outer housing, thereby attenuating vibration transmitted to the outer housing from the inner housing; and an over-travel limit member positioned in the first annular gap, wherein, in response to relative movement between the inner housing and the outer housing while the oscillating power tool is in use, the over-travel limit member is configured to prevent direct contact between the inner housing and the outer housing, inhibiting vibration produced by the motor and/or the drive mechanism from bypassing the damping element, and wherein the over-travel limit member is configured to limit lateral movement of the inner housing relative to the outer housing in a direction transverse to the output axis to a distance that is less than a width of the second annular gap.

2. The oscillating power tool of claim 1, wherein the over-travel limit member is configured as a single, annular elastic band positioned around an outer circumference of the inner housing.

3. The oscillating power tool of claim 1, wherein the over-travel limit member is one of at least two discrete elements, wherein the at least two discrete elements are spaced from each other about an interior surface of the head portion.

4. The oscillating power tool of claim 3, wherein each discrete element is configured as an elastic pad.

5. The oscillating power tool of claim 1, wherein the over-travel limit member is fixed to the inner housing or the outer housing.

6. The oscillating power tool of claim 5, wherein the over-travel limit member includes a rib received within a corresponding groove in the inner housing for fixing the over-travel limit member to the inner housing.

7. The oscillating power tool of claim 5, wherein an inner surface of the outer housing defines an interior recess, and wherein the over-travel limit member is retained in the interior recess for fixing the over-travel limit member to the outer housing.

8. The oscillating power tool of claim 1, further comprising a clamping mechanism for releasably coupling a tool element to the output shaft, the clamping mechanism including a clamping actuator operable by a user to adjust the clamping mechanism between a locking state in which the tool element is secured to the output shaft, and a release state in which the tool element may be removed from the output shaft, wherein the head portion of the outer housing includes an elongated opening in which the clamping actuator is recessed, thereby forming a gap between the clamping actuator and an outer periphery of the head portion.

9. An oscillating power tool comprising:

an outer housing having a head portion and a handle portion extending therefrom;

an inner housing positioned within the outer housing;

a motor and a drive mechanism supported by the inner housing, the drive mechanism including an output shaft that is rotational in an oscillating manner and that defines an output axis;

a damping element positioned between the inner housing and the outer housing through which the inner housing is mounted to the outer housing, thereby attenuating vibration transmitted to the outer housing from the inner housing; and a clamping mechanism for releasably coupling a tool element to the output shaft, the clamping mechanism including a clamping actuator operable by a user to adjust the clamping mechanism between a locking state in which the tool element is secured to the output shaft, and a release state in which the tool element may be removed from the output shaft, wherein the head portion of the outer housing includes an elongated opening in which an entirety of the clamping actuator is recessed, thereby forming a gap between the clamping actuator and an outer periphery of the head portion.

10. The oscillating power tool of claim 9, wherein the head portion extends along the output axis between a first end and a second end opposite the first end, the tool element positionable adjacent the first end, the second end having the elongated opening.

11. The oscillating power tool of claim 10, wherein the head portion includes a projection extending outwardly from a surface of the outer housing away from the first end, the projection at least partially defining the elongated opening.

12. The oscillating power tool of claim 9, wherein the elongated opening has a first length measured between a first end and a second end opposite the first end, and wherein the clamping actuator has a second length that is less than the first length.

13. The oscillating power tool of claim 12, wherein the second length is selected such that a space is defined between an end of the clamping actuator and the second end of the elongated opening, and wherein the space is sized to receive a finger.

14. The oscillating power tool of claim 9, wherein the clamping mechanism includes a biasing member configured to apply a clamping force to the tool element when the clamping mechanism is in the locking state, and the clamping actuator is configured to release the clamping force when the clamping mechanism is in the release state.

15. An oscillating power tool comprising:

an outer housing having a head portion and a handle portion extending therefrom;

an inner housing positioned within the outer housing;

a motor and a drive mechanism supported by the inner housing, the drive mechanism including an output shaft that is rotational in an oscillating manner and that defines an output axis;

a damping element positioned between the inner housing and the outer housing through which the inner housing is mounted to the outer housing, thereby attenuating vibration transmitted to the outer housing from the inner housing;

a clamping mechanism for releasably coupling a tool element to the output shaft, the clamping mechanism including a clamping actuator operable by a user to adjust the clamping mechanism between a locking state in which the tool element is secured to the output shaft, and a release state in which the tool element may be removed from the output shaft; and an over-travel limit member positioned between the inner housing and the outer housing, wherein, in response to relative movement between the inner housing and the outer housing while the oscillating power tool is in use, the over-travel limit member is configured to prevent direct contact between the inner housing and the outer housing, inhibiting vibration produced by the motor and/or the drive mechanism from bypassing the damping element, and wherein the head portion of the outer housing includes an elongated opening in which an entirety of the clamping actuator is recessed, thereby forming a gap between the clamping actuator and an outer periphery of the head portion.

16. The oscillating power tool of claim 15, wherein the over-travel limit member is positioned in the head portion.

17. The oscillating power tool of claim 15, wherein the over-travel limit member is fixed to the inner housing or the outer housing.

18. The oscillating power tool of claim 15, wherein the head portion extends along the output axis between a first end and a second end opposite the first end, the tool element positionable adjacent the first end, the second end having the elongated opening.

* * * * *